United States Patent
Oeda et al.

(10) Patent No.: US 6,351,600 B1
(45) Date of Patent: Feb. 26, 2002

(54) ELECTRONIC IMAGE RECORDING/REPRODUCING APPARATUS AND METHOD

(75) Inventors: Hideshi Oeda, Suita; Masahiro Shioji, Neyagawa; Hideki Toyoda, Osaka; Masaru Higashide, Moriguchi, all of (JP)

(73) Assignee: Sanyo Electric Co., Ltd., Moriguchi (JP)

( * ) Notice: Subject to any disclaimer, the term of this patent is extended or adjusted under 35 U.S.C. 154(b) by 0 days.

(21) Appl. No.: 09/024,565

(22) Filed: Feb. 17, 1998

(30) Foreign Application Priority Data

Feb. 17, 1997 (JP) .............................................. 9-031921

(51) Int. Cl.⁷ .............................................. H04N 5/928
(52) U.S. Cl. ......................................... 386/96; 386/104
(58) Field of Search .............................. 386/46, 96, 97, 386/104, 105, 107, 117, 95, 106, 75; 358/906, 909.1; 348/232; H04N 5/928

(56) References Cited

U.S. PATENT DOCUMENTS

| | | | |
|---|---|---|---|
| 5,555,098 A | * 9/1996 | Parulski | 386/104 |
| 5,610,723 A | * 3/1997 | Yamagishi | 386/75 |
| 5,731,852 A | * 3/1998 | Lee | 386/96 |
| 6,028,980 A | * 2/2000 | Yamagata | 386/96 |

FOREIGN PATENT DOCUMENTS

JP 6-90429 3/1994

* cited by examiner

*Primary Examiner*—Huy Nguyen
(74) *Attorney, Agent, or Firm*—Armstrong, Westerman, Hattori, McLeland & Naughton, LLP

(57) ABSTRACT

An electronic image recording apparatus is a digital still camera, for example. If a camera mode is set by using a mode selecting button, an image signal from an imager is compressed and recorded into a flash memory. Then, if a sound button is depressed, during a constant time period, a sound signal to the image data is compressed and written into the memory. At this time, an address of an area in which the sound data is recorded is written in an image data area. If a continuous reproducing mode is set by the mode selecting button, a CPU reads first image data from the memory, and expands the image data and writes into a VRAM. Therefore, the first image data is displayed on an attached liquid crystal monitor. The CPU determines whether or not the recording address of the sound data is written in the image data area. When the address is recorded, a first sound data is read from the memory according to the address, and the first sound data is expanded and outputted on a speaker and etc. The sound data is recorded for the constant time period, and therefore, the CPU reproduces second image data after the first sound data is wholly reproduced.

3 Claims, 2 Drawing Sheets

ELECTRONIC IMAGE RECORDING/ REPRODUCING APPARATUS AND METHOD

BACKGROUND OF THE INVENTION

1. Field of the Invention

This invention relates to an electronic image recording/ reproducing apparatus and method, and more particularly to an apparatus and method of recording a plurality of images and sounds (sound memos) related thereto in a recording medium, and continuously reproducing images from the recording medium as, for example, in a digital still camera.

2. Description of the Related Art

In an electronic image recording apparatus such as a digital still camera, a so-called automatic continuous reproducing operation is possible. In this operation, images and sounds related thereto are recorded in a recording medium such as a flash memory and the images are automatically read out, in order, of the recording medium by designating a continuous reproducing mode, thereby displaying them on a monitor.

A method for periodically reproducing a sound related to an image in a conventional digital still camera has been proposed in, for example, Japanese Patent Laying-open No. 6-90429 [H04N 5/91, G03B 19/02] laid-open on Mar. 29, 1994. In the prior art, when a recording time of the image signal and a recording time of the sound signal are close to each other within a predetermined time period, the image signal and the sound signal are combined with each other and reproduced. This prior art was proposed to solve a disadvantage in a prior-known method, that is, a method that a control file (relation table) indicative of relationship between the image signals and the sound signals is formed in another area of a memory.

More specifically, in the method using the control file, there was a disadvantage in that the image and the sound cannot be reproduced in correspondence to each other if the control file has been erroneously erased. Therefore, in the prior art, in order to surely reproduce the image and the sound in correspondence with each other even if information indicating the relationship, the respective recording times are utilized. According to this prior art, the disadvantage of the method using the control file can be solved; however, there remains another disadvantage to be solved.

In the method of the prior art, there is no problem in the usage that the image signal and the sound signal are simultaneously recorded. However, if the image recording time and the sound recording time differ from each other more than the predetermined time period, it is impossible to reproduce the image and sound signals in relation to each other. Therefore, in a so-called "after recording" in which only an image signal is recorded in advance and a sound signal in connection to the image signal is recorded later, it may be impossible to reproduce both signals in relation to each other because in such a case of "after recording", the image recording time and the sound recording time largely deviate from each other.

SUMMARY OF THE INVENTION

Therefore, it is a principal object of this invention to provide a novel electronic image recording/reproducing apparatus and method.

It is another object of the invention to provide an electronic image recording/reproducing apparatus and method, in which even if there is no control file and a recording time of an image signal and a recording time of a sound signal largely deviate from each other, it is possible to surely reproduce the image signal and the sound signal related thereto in relation to each other.

An electronic image recording apparatus according to the invention comprises: an image inputting means which inputs image data; a sound inputting means which inputs sound data; a recording medium capable of recording the image data and the sound data; an image recording means which writes the image data in the recording medium so as to form an image data area; a sound recording means which writes the sound data in the recording medium so as to form a sound data area; and an address recording means which writes an address of the sound data area into the image data area at a time that the sound data area is formed by the sound recording means.

Where the electronic image recording apparatus is a digital still camera, if a camera mode is set for example by a reproduce/camera mode selecting button, by means of the image recording means, the image signal from an imaging device is compressed according to a predetermined compressing method, for example, JPEG, and recorded in the recording medium such as a flash memory, and therefore, the image data area is formed. The sound data related to the image can be recorded by the sound recording means in the recording medium by compressing the sound signal related to the image signal for a predetermined time period, e.g., 6 seconds, due to the operation, for example, of a sound memo button. Then, the address of the sound data area in which the sound data is recorded, preferably a starting address is recorded in the image data area by the address recording means.

An electronic image reproducing apparatus according to the invention reproduces an image and a sound from a recording medium on which the image and the sound concerning with the image are respectively recorded in an image data area and a sound data area, and the electronic image reproducing apparatus comprises: an image reproducing means which reproduces a first image from the image data area of the recording medium; an address detecting means which detects an address which indicates the sound data area and recorded in the image data area; and a sound reproducing means which reproduces the sound data in the sound data area related to the address as a first sound at a time that the address is detected by the address detecting means.

Where the electronic image recording apparatus is a digital still camera, if the reproduce/camera mode button is operated continuously or a predetermined time period, e.g. 2 seconds, setting is made for an automatic continuous reproducing mode. In this continuous reproducing mode, a CPU which constitutes the image reproducing means reads a first image out of the recording medium, and extends the image to write it into a VRAM. Accordingly, the first image is displayed on an attached liquid crystal monitor or TV monitor. The address detecting means is constituted by the CPU, which determines whether or not the address indicative of the first sound related to the first image is recorded in the recording medium. If the address of the sound data area is recorded in the image data area, the sound reproducing means, i.e. the CPU reads-out the first sound from the recording medium according to the sound recording address so that the first sound is expanded and outputted to a speaker, earphone or sound output terminal, for example, through a register and a D/A converter.

Since this first sound is recorded for a predetermined time period, e.g. 6 seconds, the CPU reproduces a second image after completely reproducing the first sound. That is, after the first sound is reproduced, the second image is read out of the address of the recording medium recorded with the second image. In addition, even if the first sound is not recorded, the second image is reproduced after the first image has been reproduced for the predetermined time period.

A method for recording an image signal according to the present invention comprises steps of: (a) writing image data in a recording medium and forming an image data area; (b) writing sound data in the recording medium and forming a sound data area; and (c) writing an address of the sound data area into the image data area at a time that the sound data area is formed.

An image reproducing method is a method for reproducing an image and a sound from a recording medium on which the image and the sound concerning with the image are respectively recorded in an image data area and a sound data area, and comprises steps of: (a) reproducing a first image from the image data area of the recording medium; (b) detecting an address which indicates the sound data area and recorded in the image data area; and (c) reproducing the sound data in the sound data area related to the address as a first sound at a time that the address is detected.

In another aspect, this invention lies in a method of continuously reproducing images in an electronic image recording apparatus having a recording medium recorded with images and sounds related thereto, the continuous reproducing method, comprising: (a) reproducing a first image from the recording medium; (b) determining whether or not a first sound related to the first image is recorded in the recording medium; (c) reproducing the first sound from the recording medium when the first sound is recorded therein; and (d) reproducing a second image after ending the reproduction of the first sound.

According to this invention, when a sound related to an image is recorded in a recording medium, the sound in addition to the image can be reproduced automatically and continuously. In such a case, if the sound is recorded, the recording address of the related sound is recorded in the image data area, and therefore, it is possible to determine whether or not the sound related to the image is recorded by using the address. Therefore, as different from the first conventional method, it is unnecessary to separately prepare the control file (table). Furthermore, in the second conventional method, in a case where the image recording time and the sound recording time largely deviate from each other, even if the sound related to the image has been recorded, the both cannot be reproduced in relation to each other, and therefore, in a case where the sound is recorded through "after recording", it is impossible to simultaneously reproduce the image and the sound. In contrast, in the present invention, if the sound related to the image is recorded, the address of the sound data area is written in the image data area, and therefore, when the address is recorded, the sound specified by the address can be reproduced. Accordingly, even if the sound is recorded through "after recording", the image and the sound concerning therewith can be reproduced in synchronous with each other.

The above described objects and other objects, features, aspects, and advantages of the present invention will become more apparent from the following detailed description of the present invention when taken in conjunction with the accompanying drawings.

DETAILED DESCRIPTION OF THE PREFERRED EMBODIMENTS

Figure 1:
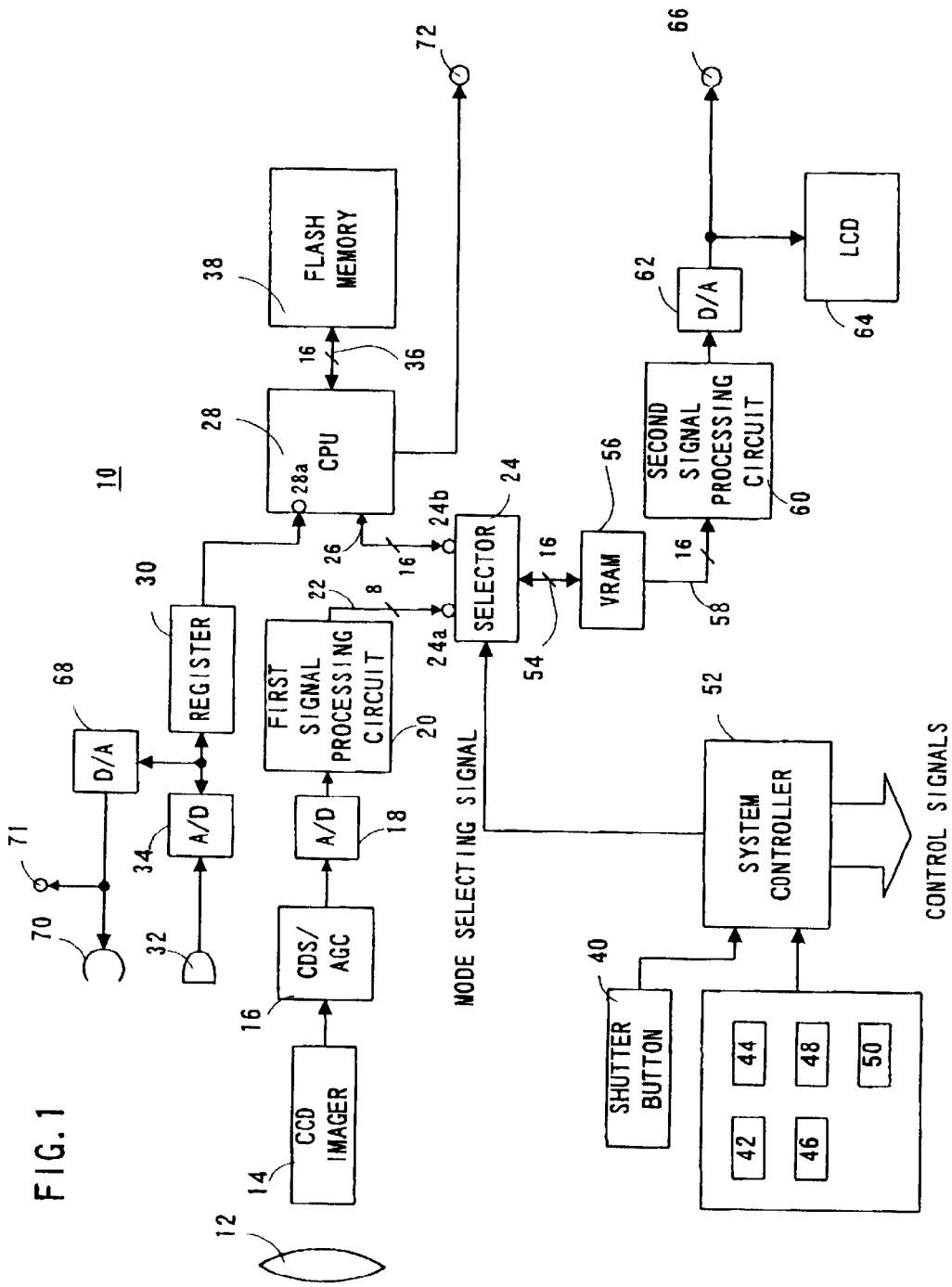
FIG. 1 is a block diagram showing one embodiment of this invention.

Referring to FIG. 1, a digital still camera 10 of this embodiment includes a lens 12. Through this lens 12 is given an optical image which is converted into an electric signal by a CCD imager 14. The CCD imager 14 has a color filter, for example, in a primary color Bayer arrangement so as to output an electric signal (progressive scan signal) for each pixel according to progressing scan (pixel sequential scan).

The progressive scan signal from the CCD imager 14 is supplied to a CDS/AGC circuit 16. The CDS/AGC circuit 16 subjects known noise removal and level adjustment to the progressive scan signal from the CCD imager 14. The progressive scan signal processed by this CDS/AGC circuit 16 is converted into digital data by an A/D converter 18. The digital data of the progressive scan signal outputted from the A/D converter 18 is supplied to a first signal processing circuit 20. The first signal processing circuit 20 subjects known white-balance adjustment and gamma correction to the digital data (image data) outputted from the A/D converter 18 to supply the image data through an 8-bit bus 22 to a first input 24a of a selector 24. The selector 24 selects the first input 26a or the second input 26b depending upon a mode being set (camera mode or reproducing mode).

The second input 24b of the selector 24 is connected to a CPU 28 through a 16-bit bi-directional bus 26. The CPU 28 is for example a 16-bit CPU. The CPU 28 has an interrupt terminal 28a, to which interrupt terminal 28a is supplied a sound interruption from for example a 5-byte sound register 30.

The sound for a sound memo is supplied from a microphone 32 to an A/D converter 34 so that the sound data from the A/D converter 34 is supplied to a sound register 30. Each time the sound register 30 is loaded, for example, with 5 bytes of sound data, a sound interruption is inputted from the sound register 30 to the interrupt terminal 28a of the CPU 28.

The CPU 28 is further connected to a flash memory 38 through a 16-bit bus 36. This flash memory 38 is a recording medium which has a capacity, for example of 2M bytes to record compressed images and sounds according to an operating program of the CPU 28 and a compression method, for example, of JPEG. Incidentally, other non-volatile RAMs, other than the flash memory, may be employed as the recording medium.

The digital still camera 10 further includes a shutter button 40, a reproduce/camera mode selecting button 42, a resolution change-over button 44, a monitor on/off button 46, a sound memo button 48, an erase button 50 and so on. The operating signal from the operating button 40–50 is supplied to a system controller 52. The system controller 52 outputs a predetermined control signal depending upon an operating signal by the button 40–50. The control signal is converted into a serial signal by a P/S converter (not shown) to be supplied to the interrupt terminal 28a of the above-stated CPU 28.

For example, when the shutter button 40 is depressed, the system controller 52 outputs a shutter signal so that the shutter signal is supplied to the interrupt terminal 28a of the CPU 28. In response thereto, the CPU 28 suspends the CCD imager 14 from being inputted (renewed) so that a still picture signal upon the depression of the shutter button 40 is outputted from the CCD imager 14. Meanwhile, if the reproduce/camera mode selecting button 42 is operated, the system controller 52 outputs a control signal representative of either of a reproducing mode or a camera mode. The control signal is supplied to the CPU 28 and also to the selector 24. Accordingly, if the camera mode is set for example, the selector 24 selects the first input 24a, while if the reproducing mode is selected, it selects the second input 24b.

The selector 24 is connected to a VRAM 56 through a 16-bit bus 54. This VRAM 56 is structured for example by a dual-port RAM so that the VRAM can be written through an input bus 54 and simultaneously read out through an output bus 58. This VRAM 56 is used principally to display images on an LCD 64 (to be stated later), and it is inherently satisfactory if it has a capacity of approximately 360K bytes. This embodiment, however, utilizes VRAM 56 having a capacity of 512K bytes. Therefore, the region, except for a region used for image representation, is utilized as a working memory for the CPU 28 or temporarily retreating a program from the flash memory 38.

The output bus 58 is also a 16-bit bus so that the image data read out of the VRAM 56 is supplied, to a second signal processing circuit 60. The second signal processing circuit 60 includes, for example, a color separating circuit and a matrix circuit, both not shown, so as to convert the image data read out of the VRAM 56 into luminance data and chrominance data. The luminance data and the chrominance data outputted from the second signal processing circuit 60 are converted into an analog luminance signal and chrominance signal by a D/A converter 62. The luminance signal and the chrominance signal from the D/A converter 62 are supplied to the LCD 64 provide on the digital still camera 10 or to a TV monitor (not shown) through an output terminal 66.

In order to reproduce sounds, the digital still camera 10 further includes a D/A converter 68. This D/A converter 68 converts the sound data loaded on a sound register 30 into an analog sound signal. This sound signal is supplied to an earphone 70, a speaker (not shown) or a sound output terminal 71.

Incidentally, where the image data and the sound data obtained by the digital still camera 10 is given to a computer, the image data and the sound data are outputted through an output terminal 72 connected to the CPU 28.

In the digital still camera 10 shown in FIG. 1, if the camera mode is set by the reproduce/camera mode selecting button 40, the selector 24 selects its first input 24a. At this time, if the monitor on/off button 46 is operated as required, the LCD 64 can be utilized as a viewfinder.

In this state, while the shutter button 40 is not depressed, the image data obtainable by converting the progressive scan signal from the CCD imager 14 into digital data by the A/D converter 18 is supplied to the first input 24a of the selector 24 via the first signal processing circuit 20 and the bus 22. Since the selector 24 in a camera mode is selected of its first input 24a as explained hereinbefore, the image data from the first signal processing circuit 20 is supplied for example in a DMA (direct memory access) to the VRAM 56 via the input bus 54. The image data supplied to the VRAM 56 is outputted onto an output bus 58, hence displaying an image on the LCD 64. Before depression of the shutter button 40, the VRAM 56 is renewed by the output of the CCD imager 14, i.e. the first signal processing circuit 20 so that the LCD 64 serves as a viewfinder.

When the shutter button 40 is depressed, a shutter signal is outputted from the system controller 52 and supplied to the interrupt terminal 28a of the CPU 28. Accordingly, the CPU 28 freezes the CCD imager 14. Therefore, the VRAM 56 is finally written by the image data due to the depression of the shutter button 40. The CPU 28 reads out the image data written in the VRAM 56, and carries out a well-known signal process such as JPEG to compress the image data. The compressed image data is stored in the flash memory 38.

At this time, if the sound memo button 48 is operated to input a sound through the mike 32, the sound is converted into sound data by the A/D converter 34 and loaded in the sound register 30. The sound register 30 has a capacity of 5 bytes as stated alone that, when the sound register is become full in capacity, a sound interruption is given from the sound register to the interrupt terminal 28a of the CPU 28. That is, the sound interruption is given to the CPU 28 every 5 bytes (e.g. 10H). The CPU 28 compresses the inputted sound data, e.g. 8 bits into 4 bits, according to the predetermined signal process so as to write it into a predetermined sound area of the VRAM 56.

When the CPU 28 writes image data into the flash memory 38, the CPU 28 cannot write sound data to the flash memory 38. Accordingly, the sound data compressed by the CPU 28 according to the sound interruption is temporarily written into an appropriate area of the VRAM 56.

Determination is then made as to whether the CPU 28 has processed a predetermined time period, e.g., 6 seconds, of sound data or not. As stated before, the sound interruption is inputted every 10H, and 5 bytes of sound data is processed each time. The processing of 6 seconds of sound data requires the reception of 9450 times (=525×6÷10×30) of sound interruptions. Therefore, the CPU 28 has a sound interrupting counter (not shown) so that, if the sound interrupting counter counts 9450 times of sound interruptions, the CPU 28 confirms that the processing of the sound data is ended. Incidentally, this "9450" has been calculated on the assumption that the number of horizontal scanning lines is 525 and one frame is at 1/30 second.

When the CPU 28 detects an end of the sound interruption, the CPU 28 writes the 6-second sound data accumulated in the VRAM 56 into the flash memory 38. At this time, by writing a head address, on which the sound data is to be written to the area beforehand, written by the image data, the CPU 28 can determine later whether a sound memo related to an image is recorded or not.

In this manner, in the camera mode the flash memory 38 is written by the respective compressed image data and sound data related thereto.

When a reproducing mode is selected by the reproduce/camera mode selecting button 42, the selector 24 selects its second input 24a due to a reproducing mode signal. In the reproducing mode, the CPU 28 reads image data out of the flash memory 38 to write this image data to a predetermined area of the VRAM 56 through the selector 24. Then the CPU 28 expands the image data temporarily written in the VRAM 56 according to the predetermined signal process, e.g., JPEG. The expanded image data is written into the VRAM 56 through the selector 24. Therefore, image data is outputted from the VRAM 56 through the second signal processing circuit 60 and the D/A converter 62 to the LCD 64 so that a reproduced image is displayed thereon.

In the reproducing mode, the sound data read out of the flash memory 38 is expanded by the CPU 28 similarly to the image data, and outputted through the interrupt terminal 28a of the CPU 28 to the sound register 30. Therefore, the sound memo written in the flash memory 38 is reproduced through the earphone 70.

Incidentally, in the reproducing mode, if a shutter button 40 or an erase button 50 is operated in a state that a reproduced image is being displayed on the LCD 64, the CPU 28 responds to the operations to erase the image picture data from the flash memory 38.

Figure 2:
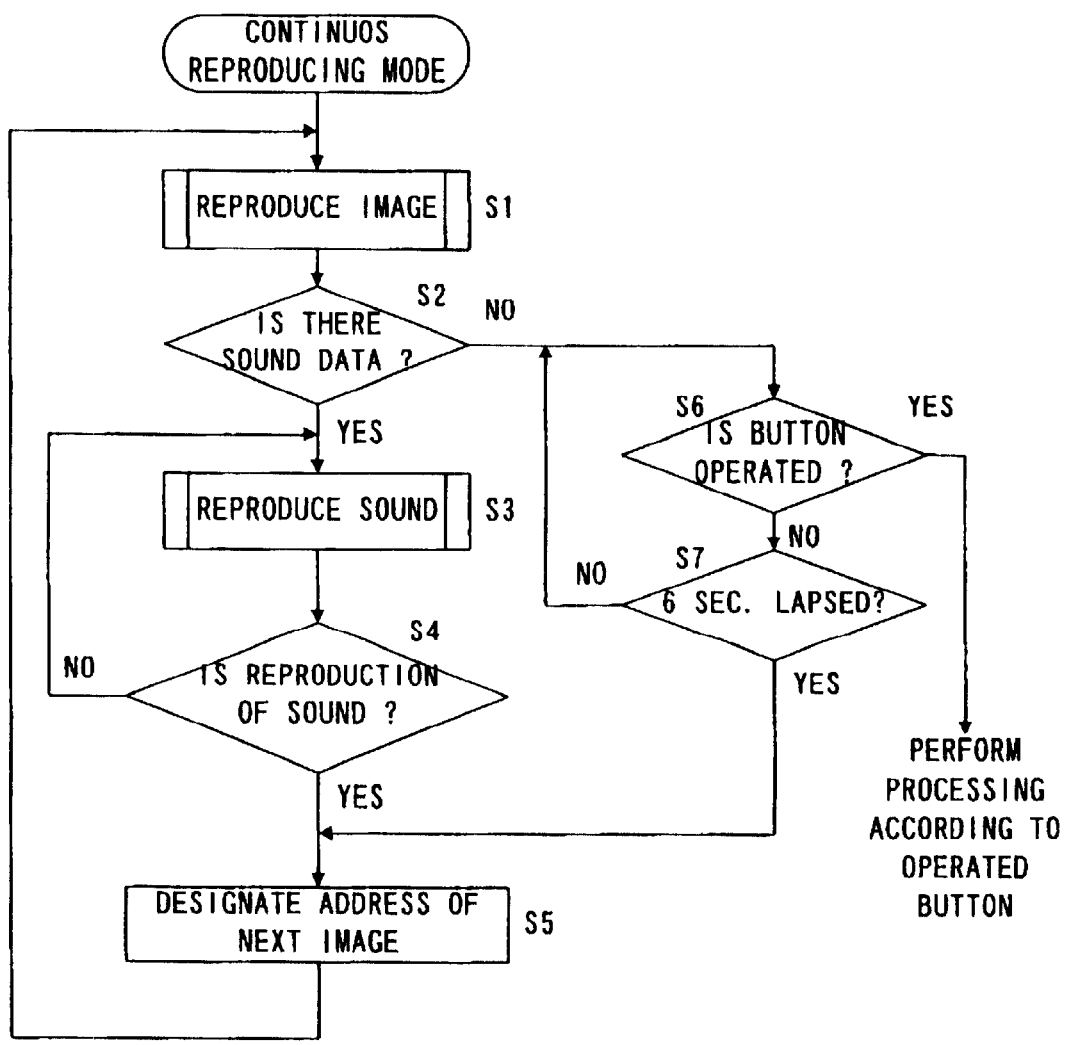
FIG. 2 is a flowchart showing the operation of an automatic continuous reproducing mode in the FIG. 1 embodiment.

If the reproduce/camera mode selected button 42 is continuously operated over a given time period (for 2 seconds) or longer, setting is made for an automatic continuous reproducing mode as shown in FIG. 2. At a first step S1 of the continuous reproducing mode, the CPU 28 reproduces the image data recorded in the flash memory 38 in a manner stated before. At a next step S2, the CPU 28 determines whether or not a sound data address is recorded at the area of the flash memory 38 recorded with the image data. That is, at the step S2, the CPU 28 determines the presence or absence of sound data, When the determination is on the presence of sound data, the CPU 28 reproduces, at a step S3, the sound data out of the flash memory 38 in a manner as explained before. At a next step S4 the CPU 28 determines whether or not the reproduction of the sound data is ended, that is, whether or not all the sound data is outputted through the interrupt terminal 28a of the CPU 28, that is, whether or not the sound interruption counter (not shown) has counted "9450". If the ending for the sound data is determined the step S4, the CPU 28 designates, at the step S5, the address of the flash memory 38 at which a next image is recorded, and the process returns to the step S1.

Incidentally, when the absence of sound data is determined at the step S2, the CPU 28 determines at a step S6, depending upon the signal from the system controller 52, whether any key or button is operated or not. If any key or button is operated, the CPU 28 executes a predetermined process depending upon the button thus operated. If no button is operated, the CPU 28 causes, at a step S7, the LCD 64 to continuously display the image reproduced at the step S1 until it detects the lapse of 6 seconds. When the lapse of 6 seconds is detected at the step S7, the process proceeds to the aforesaid step S5 to designate an address for the next image to the flash memory 38.

In this manner, in the continuous reproducing mode, the CPU 28, after reproducing an image, determines whether or not the sound data related to the image is recorded. When the sound data is recorded, the sound data is reproduced and then the next image is reproduced. Therefore, images and sounds related thereto are reproduced automatically and continuously.

Incidentally, although in the above embodiment part of the VRAM 56 was utilized as a working memory for the CPU 28, another working memory may be provided. Also, explanations were on the embodiment that the electronic image recording apparatus is a digital still camera. However, this invention is applicable to an arbitrary electronic image recording apparatus that has a recording medium for recording an image and a sound related thereto.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An electronic image reproducing apparatus which reproduces an image and a sound from a recording medium on which the image and the sound concerned with the image are respectively recorded in an image data area and a sound data area, said electronic image reproducing apparatus comprising:

an image reproducing means for reproducing a first image from the image data area of the recording medium;

an address detecting means for detecting an address which indicates the sound data area and which is recorded in the image data area;

a sound reproducing means for reproducing the sound data in the sound data area related to the address as a first sound at a time that the address is detected by the address detecting means;

a time period detecting means for detecting that a constant time period elapsed when the address detecting means does not detect the address, wherein the image reproducing means reproduces a second image in response to a detection by the time period detecting means, and wherein the address is a starting address of the sound data area in which the sound data is written.

2. An electronic image reproducing apparatus according to claim 1, wherein the sound reproducing means reproduces the sound data of a constant time period as the first sound.

3. An electronic image reproducing apparatus according to claim 2, further comprising a completion detecting means for detecting completion of reproduction of the sound data by the sound reproducing means, wherein the image reproducing means reproduces a second image from the image data area after the completion is detected by the completion detecting means.

* * * * *